United States Patent [19]

Frauenfeld et al.

[11] Patent Number: 4,933,223
[45] Date of Patent: Jun. 12, 1990

[54] MATRIX FOR THE SUPPORT OF CATALYTICALLY ACTIVE COMPOUNDS, AND METHOD FOR PRODUCING THE MATRIX

[75] Inventors: Martin Frauenfeld; Kurt Veser, both of Heidelberg, Fed. Rep. of Germany

[73] Assignee: Kraftanlagen AG, Heidelberg, Fed. Rep. of Germany

[21] Appl. No.: 262,153

[22] Filed: Oct. 17, 1988

Related U.S. Application Data

[63] Continuation of Ser. No. 913,657, filed as PCT EP86/00007 on Jan. 10, 1986, published as WO86/04265 on July 31, 1986, abandoned.

[30] Foreign Application Priority Data

Jan. 17, 1985 [DE] Fed. Rep. of Germany ....... 3501330

[51] Int. Cl.$^5$ ............................................. A21B 1/00
[52] U.S. Cl. ..................................... 428/73; 428/116; 428/432; 428/698; 428/323; 427/215
[58] Field of Search ................... 502/247, 2; 428/432, 428/116, 73, 698, 699, 323; 427/215

[56] References Cited

U.S. PATENT DOCUMENTS

| 3,087,607 | 4/1963 | Robinson | 428/116 X |
|---|---|---|---|
| 3,088,271 | 5/1963 | Smith | 428/116 X |
| 3,112,184 | 11/1963 | Hollenbach | 428/116 X |
| 3,266,477 | 8/1966 | Stiles | 502/2 X |
| 3,460,523 | 8/1969 | Stiles et al. | 502/247 X |
| 4,084,975 | 4/1978 | Faust | 428/432 X |
| 4,264,346 | 4/1981 | Mann | 428/73 X |
| 4,348,360 | 9/1982 | Chang et al. | 428/116 X |
| 4,448,833 | 5/1984 | Yamaguchi et al. | 428/116 |
| 4,451,516 | 5/1984 | Kato | 428/116 |
| 4,451,517 | 5/1984 | Inoguchi et al. | 428/116 |
| 4,521,532 | 6/1985 | Cho | 428/116 X |
| 4,568,595 | 2/1986 | Morris | 428/116 |
| 4,598,063 | 7/1986 | Retallick | 428/116 X |

Primary Examiner—Nancy A. B. Swisher

[57] ABSTRACT

A supporting matrix for catalytically active compounds, for use, for example, in catalysts for the catalytic cracking of nitrogen oxides, is constructed of a metal core (1), an intermediate layer (3) of vitreous enamel bonded onto this core, and a porous ceramic cover coating (5) applied to the vitreous enamel intermediate layer.

The supporting matrix is made by dipping the metal core into a vitreous enamel slip followed by firing at 800° to 900° C. The enameled metal core is then fired in a second firing to form the ceramic cover coating which represents the actual support for the catalytically active compounds.

4 Claims, 1 Drawing Sheet

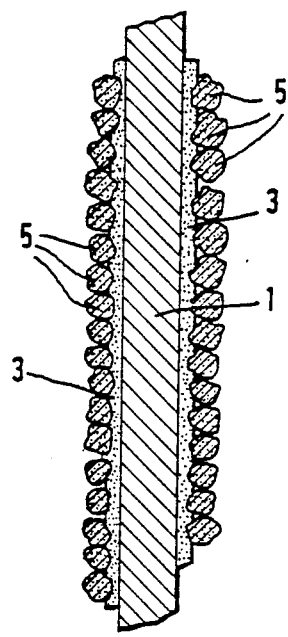

MATRIX FOR THE SUPPORT OF CATALYTICALLY ACTIVE COMPOUNDS, AND METHOD FOR PRODUCING THE MATRIX

This is a continuation of Ser. No. 913,657, filed as EP86/00007 on Jan. 10, 1986, published as WO86/04265 on July 31, 1986, now abandoned.

The invention relates to a supporting matrix for the absorption of catalytically active compounds, with the use of ceramic, especially for alternating exposure, with relative movement of the supporting matrix, to exhaust gas and combustion air streams in furnaces and boilers, and to a method for producing such a matrix.

To dispose of the nitrogen oxides contained in the exhaust gases issuing from power plants, catalysts which consist of a uniform mixture of a ceramic and metallic, catalytically active compounds have proven to be practical. Such catalysts have a honeycomb structure for the passage of the exhaust gases to be stripped and for dividing them into partial streams, and the exhaust gases are directed alternately through several such catalysts in the form of statically disposed beds. By mixing the metallic, catalytically active compounds uniformly into the ceramic as support, sufficient resistance to the working temperature and to the temperature changes in the start-up and shut-down procedures of the boiler system is achieved. The wall thicknesses of the honeycombs are selected in accordance with these thermal stresses and with the mechanical and hydraulic stresses involved in the exhaust gas purification process. In order to achieve the required percentage of conversion of the nitrogen oxides, several honeycombs are stacked one over the other, as a rule, in the direction of flow of the exhaust gases to form correspondingly longer reaction paths.

Furthermore, molecular sieves in bulk beds have been proposed for the removal of nitrogen oxides from exhaust gases. The great effectiveness of these kinds of the catalysts, however, must be reckoned against the appreciable pressure loss accompanying the passage of the exhaust gases through the bulk bed.

Finally, catalysts are also known in which metallic supports—grids for example—are completely enveloped by a ceramic coating to absorb catalytically active compounds. In this connection numerous proposals have been made for improving the adherence of the ceramic coating by roughening the surface of the metal support to provide a mechanical "tooth" for it. It has been found, however, that especially when the catalyst is subject to mechanical stress in addition to the thermal shock stresses, the adherence of the ceramic coating to the metal is either unsatisfactory or is sensitive to shock.

The invention is therefore addressed to the problem of creating a reliable bond between a metallic support and a ceramic coating intended for the absorption of catalytically active compounds, so as to have a long life even under constant exposure to temperature changes and great hydraulic and mechanical stresses such as occur, for example, in the cleaning of heating surfaces of rotating regenerative heat exchangers by the soot blowers used in cleaning them.

Setting out from a supporting matrix of the kind described in the beginning, this problem is solved according to the invention by a metallic support, at least one intermediate layer adhered to the support, at least one of such layers consisting of vitreous enamel, and by a ceramic cover coating applied to the intermediate layer to absorb catalytically active compounds.

By the coupling action of the intermediate layer of vitreous enamel it is surprisingly possible to produce a reliable bond between a metallic support on the one hand and a ceramic coating on the other. In addition to the purpose of the intermediate layer, namely to serve as a coupling means between the core metal and the ceramic coating, differences in the expansion of the metallic support and of the ceramic coating under alternating thermal and mechanical stresses are at the same time compensated by the enamel. On account of the greater ability of the supporting matrix according to the invention to withstand stress, there now exists an improved possibility for cleaning the catalytically active surfaces, which is a requirement for an extended useful life of the catalyst as a whole, since by means of more frequent and more intensive cleaning—for example by means of the above-mentioned soot blowers known to be used in the cleaning of regenerative heat exchangers—prolonged contact with any catalyst poisons that might precipitate thereon is avoided.

The metallic core of the supporting matrix according to the invention can also be in the form of corrugated and/or crimped sheet metals. Such sheet metals are assembled into storage bodies, also for example in rotating regenerative heat exchangers for preheating boiler air. By additionally coating these storage bodies with the ceramic cover coat while providing for adhesion by means of the intermediate layer of enamel, it thus becomes possible to integrate the catalyst provided for nitrogen removal with the regenerative heat exchanger for preheating the boiler air, or else catalysts made in the manner of such rotating regenerative heat exchangers can be constructed which will permit constant cleaning of areas through which the boiler exhaust gases are not flowing. The shape given to the core sheet metal will then produce a turbulence that contributes to an effective heat exchange and at the same time to an improved conversion of nitrogen oxides.

The thickness of the metallic core is preferably selected in the range between 0.5 and 1.0 mm, the intermediate layer of enamel then having a thickness between 0.075 and 0.15 mm and the ceramic finish coat a thickness between 0.2 and 0.5 mm. The range chosen for the thickness of the vitreous enamel intermediate layer has proven to be optimal for providing a coupling between the core metal and the ceramic finish layer. In particular, it has also been found that, if the intermediate coating thickness is selected within this range any blockage of the pores of the ceramic by enamel material is largely prevented.

In an embodiment that has proven valuable in practice, the thickness of the core metal is 0.5 mm and that of the enamel intermediate coating is 0.125 mm. The thickness of the ceramic cover coat then is about 0.25 to 0.35 mm. The ratio of the magnitude of the surfaces provided for the absorption of catalytically active compounds on the ceramic cover coat to the volume of the supporting matrix as a whole is in this case especially desirable.

In the preparation of the supporting matrix according to the invention, the procedure according to the invention to dip the core metal into a vitreous enamel slip and then fire it in the kiln at between 800° and 900° C. to form the enamel intermediate layer; then a ceramic slip is applied to the enameled metal core and fired in a kiln to form a ceramic coating bonded to the enamel intermediate layer. By performing these steps in succession, a reliable bond between the core metal and the intermediate coating of enamel is achieved in a first firing.

In the subsequent second firing of the previously applied ceramic slip, an especially reliable bonding of the resultant ceramic coating to the enamel is achieved, which is attributed to the fact that in this second firing the enamel is softened again at least superficially and the irregularities of the resultant ceramic coating sink into the softened vitreous enamel coating.

Within the scope of the invention the term, "catalytically active compounds," is not limited to compounds in the chemical sense, but is also intended to include pure elements and mixtures thereof, provided they have the desired catalytic properties.

BRIEF DESCRIPTION OF THE DRAWING

The drawing shows diagrammatically a vertical partial cross section of a supporting matrix according to the invention.

The partial cross section diagrammatically represented in the drawing shows a metal core 1 formed, for example, of sheet metal, which after immersion in an enamel slip is provided by a first firing with an intermediate coating 3 of vitreous enamel on both sides By applying a ceramic slip to the previously enameled metal core 1, 3, and then another firing, a thicker, porous ceramic coating 5 is formed on the vitreous enamel intermediate layers on each side, and has sunk into the intermediate layers 3 of enamel, which serve as a coupling means and which soften in the second firing, and are thus reliably anchored in the enamel in a mechanically interlocked manner.

We claim:

1. A method of making a supporting matrix for catalytically active compounds, comprising: providing on a metal core having a thickness of between 0.5 and 1.0 mm first an enamel coating having a thickness of between 0.075 and 0.15 mm by immersing the metal core into a vitreous enamel slip, and after removing the metal core from the enamel slip firing the coating in a kiln, thereafter applying a ceramic slip to the enamel coating and firing the same in a kiln so that the ceramic slip becomes anchored in the enamel coating softened by the firing and forms a porous ceramic cover coating adheringly bonded to the enamel coating and having a thickness of between 0.2 and 0.5 mm and said cover coating forming a support for catalytically active compounds to be alternatingly exposed to exhaust gas and combustion air of a furnace or boiler during relative movement of the supporting matrix.

2. A supporting matrix consisting of: a metal core having a thickness of between 0.5 and 1.0 mm; an intermediate enamel coating on the core and having a thickness of between 0.075 and 0.15 mm; and an outer, porous ceramic cover coating having a thickness of between 0.2 and 0.5 mm and anchored in the intermediate coating and forming a support for absorbing catalytically active compounds which are alternatingly exposed to exhaust gas and combustion air of a furnace or boiler during relative movement of the supporting matrix.

3. A supporting matrix according to claim 2, wherein the metal core is a corrugated and/or crimped metal sheet.

4. A supporting matrix according to claim 2, wherein the metal core has a thickness of about 0.5 mm, the intermediate enamel coating has a thickness of about 0.125 mm, and the porous ceramic cover coating has a thickness of between 0.25 and 0.35 mm.

* * * * *